US010609388B2

(12) United States Patent
Jung et al.

(10) Patent No.: US 10,609,388 B2
(45) Date of Patent: **\*Mar. 31, 2020**

(54) METHOD AND APPARATUS FOR ENCODING AND DECODING IMAGE

(71) Applicant: Samsung Electronics Co., Ltd., Suwon-si, Gyeonggi-do (KR)

(72) Inventors: Young Beom Jung, Seoul (KR); Nyeong Kyu Kwon, Daejeon (KR); Yo Won Jeong, Yongin-si (KR)

(73) Assignee: Samsung Electronics Co., Ltd. (KR)

( \* ) Notice: Subject to any disclaimer, the term of this patent is extended or adjusted under 35 U.S.C. 154(b) by 218 days.

This patent is subject to a terminal disclaimer.

(21) Appl. No.: 15/703,012

(22) Filed: Sep. 13, 2017

(65) Prior Publication Data

US 2018/0007369 A1      Jan. 4, 2018

Related U.S. Application Data

(63) Continuation of application No. 14/616,902, filed on Feb. 9, 2015, now Pat. No. 9,774,871.

(30) Foreign Application Priority Data

Feb. 13, 2014   (KR) ........................ 10-2014-0016864

(51) Int. Cl.
| H04N 19/176 | (2014.01) |
| H04N 19/15 | (2014.01) |
| H04N 19/127 | (2014.01) |
| H04N 19/12 | (2014.01) |

(52) U.S. Cl.
CPC ......... *H04N 19/176* (2014.11); *H04N 19/127* (2014.11); *H04N 19/15* (2014.11); *H04N 19/12* (2014.11)

(58) Field of Classification Search
CPC .... H04N 19/176; H04N 19/127; H04N 19/12; H04N 19/15; H04N 19/139; H04N 19/85
See application file for complete search history.

(56) References Cited

U.S. PATENT DOCUMENTS

| 7,123,654 B2 | 10/2006 | Song |
| 7,751,631 B2 | 7/2010 | Youn et al. |
| 7,944,965 B2 | 5/2011 | Bhaskaran et al. |
| 2003/0156648 A1 | 8/2003 | Holcomb et al. |

(Continued)

FOREIGN PATENT DOCUMENTS

| KR | 100771640 | 10/2007 |
| KR | 101099257 | 12/2011 |

(Continued)

OTHER PUBLICATIONS

"Method and Apparatus for Encoding and Decoding Image" Specification, Drawings, and Prosecution History of U.S. Appl. No. 14/616,902, filed Feb. 9, 2015 by Young Beom Jung, et al.

*Primary Examiner* — Yon J Couso
(74) *Attorney, Agent, or Firm* — Onello & Mello, LLP

(57) ABSTRACT

An image encoding apparatus based on a system on chip (SoC) which encodes a residual block of a current block including a first value calculator configured to calculate a first value for the residual block in a space domain, a comparator configured to decide whether to transform the residual block into a transform domain according to a size of the first value, and a transform unit configured to transform the residual block into the transform domain according to a decision on whether to transform.

11 Claims, 15 Drawing Sheets

(56) References Cited

U.S. PATENT DOCUMENTS

| | | |
|---|---|---|
| 2006/0164543 A1 | 7/2006 | Richardson et al. |
| 2011/0176608 A1 | 7/2011 | Kim et al. |
| 2013/0114730 A1 | 5/2013 | Joshi et al. |
| 2013/0128954 A1 | 5/2013 | Kim et al. |
| 2014/0056362 A1 | 2/2014 | Mark et al. |
| 2014/0219349 A1 | 8/2014 | Chien et al. |

FOREIGN PATENT DOCUMENTS

| | | |
|---|---|---|
| KR | 101130733 | 3/2012 |
| WO | 2013001278 | 1/2013 |
| WO | 2013001279 | 1/2013 |
| WO | 2013058541 | 4/2013 |

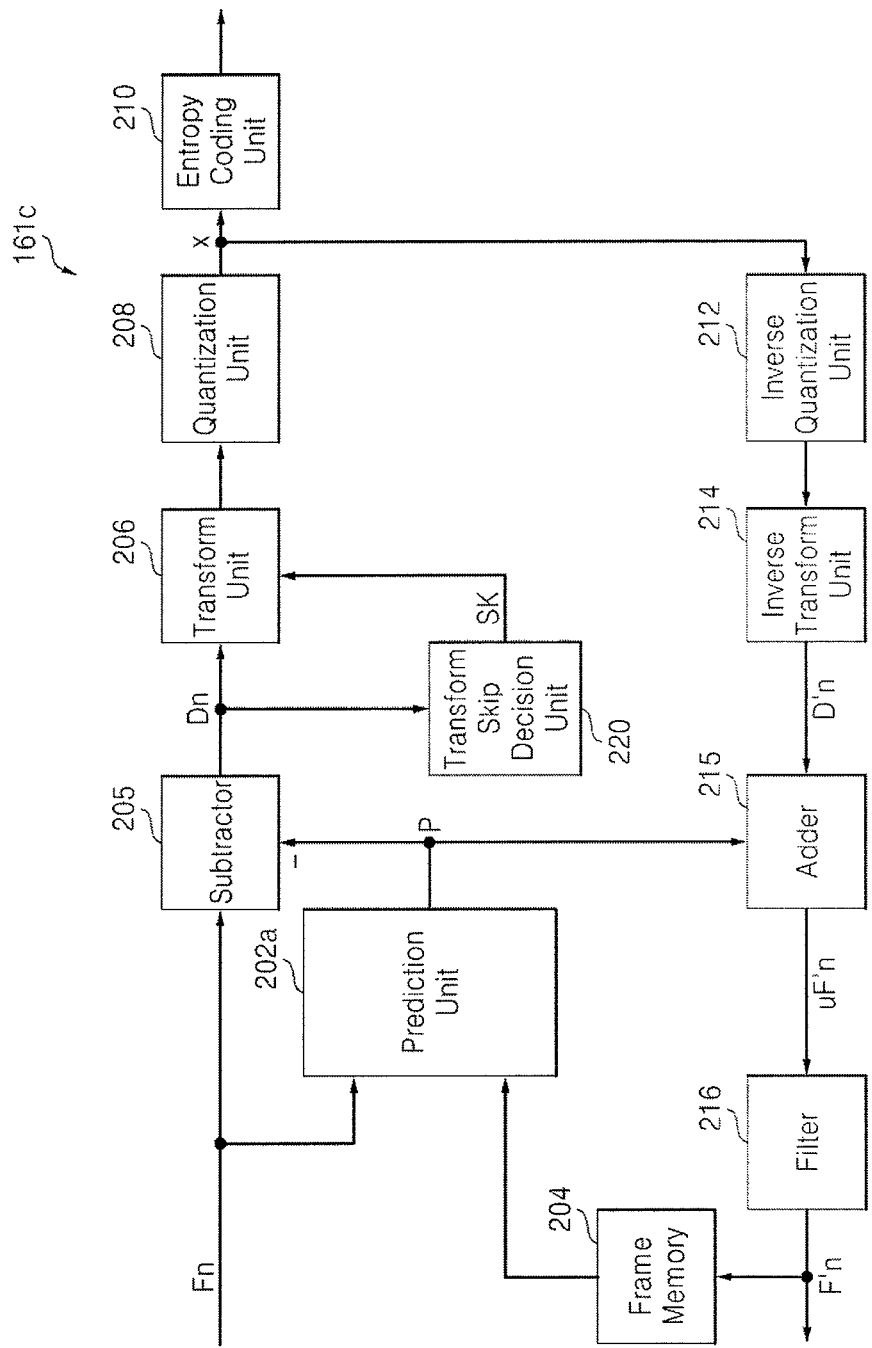

METHOD AND APPARATUS FOR ENCODING AND DECODING IMAGE

CROSS-REFERENCE TO RELATED APPLICATIONS

This application is a continuation application of U.S. patent application Ser. No. 14/616,902, filed Feb. 9, 2015, which claims priority under 35 U.S.C. § 119(a) from Korean Patent Application No. 10-2014-0016864 filed on Feb. 13, 2014 in the Korean Intellectual Property Office (KIPO), the contents of which are herein incorporated by reference in their entirety.

BACKGROUND

Embodiments of the present inventive concepts relate to a method and apparatus for encoding and decoding an image.

When an image is encoded in an image compression mode, for example, moving picture experts group phase 1 (MPEG-1), moving picture experts group phase 2 (MPEG-2), or moving picture experts group phase 4 (MPEG-4 H.264/MPEG-4) advanced video coding (AVC), a picture is divided into a plurality of macroblocks. Thereafter, each of the macroblocks is predictively encoded using inter prediction or intra prediction. Specifically, a prediction block is generated for a current block to be encoded using inter prediction or intra prediction and only a residual block obtained by subtracting the prediction block from the current block is encoded and transmitted. Instead of encoding a pixel value of each pixel included in the current block, before encoding is performed, a prediction value for each pixel included in the prediction block is subtracted from the pixel value of each pixel included in the current block to generate a residual block, so that compression efficiency is increased in encoding.

In encoding the residual block, transforming the residual block into a frequency domain, quantization, and entropy encoding are sequentially performed. The transforming of the residual block into a frequency domain may be skipped based on a high efficiency video coding (HEVC) standard. When a reference software is used to determine whether to skip transforming the residual block into a frequency domain or to transform the residual block into a frequency domain, a compression cost is calculated in rate-distortion optimization (RDO)-on mode. In this case, complex reconstruction needs to be fully performed.

SUMMARY

According to an aspect of the present inventive concepts, there is provided an image encoding method based on a system on chip (SoC) which encodes a residual block of a current block. The image encoding method includes generating a first value based on the residual block, comparing the first value with a second value and deciding whether to transform the residual block according to a comparison result, and encoding the residual block according to the decision on whether to transform the residual block.

In some embodiments, the image encoding method may further include generating the second value based on the residual block. The first value may be obtained by performing a first operation on the residual block in a space domain and the second value may be obtained by performing the first operation on the residual block in a transform domain.

In some embodiments, the first value may be a difference in the residual block in the space domain and the second value may be a difference in the residual block in the transform domain.

In some embodiments, the first value may be a sum of absolute differences (SAD) and the second value may be a sum of absolute transformed differences (SATD).

In some embodiments, the comparing the first value with the second value may be determined by a formula of $\alpha_1 > D_{SD} + \beta_1 < \alpha_2 > D_{TD} + \beta_2$, where $D_{SD}$ is the first value, $D_{TD}$ is the second value, and $\alpha_1$, $\beta_1$, $\alpha_2$, and $\beta_2$ are predetermined values. The deciding whether to transform the residual block according to the comparison result includes deciding to transform the residual block, when a condition of the formula is not satisfied, and, deciding to skip the transform of the residual block, when the condition of the formula is satisfied.

In some embodiments, the first value may be a variance in the residual block in the space domain and the second value may be a variance in the residual block in the transform domain.

In some embodiments, the comparing the first value with the second value and deciding whether to transform the residual block according to the comparison result may include deciding to skip the transform of the residual block, when the first value is greater than the second value and deciding to transform the residual block, when the first value is less than the second value.

In some embodiments, the transform domain may be obtained by transforming the space domain using Hadamard transform, discrete cosine transform (DCT), or discrete sine transform (DST).

In some embodiments, the encoding the residual block according to the decision on whether to transform may include transforming the residual block according to the decision, quantizing the residual block that has been transformed, and entropy coding the residual block that has been quantized.

According to another aspect of the present inventive concepts, there is provided an image encoding method based on a SoC which encodes a residual block of a current block. The image encoding method includes calculating a first value in a space domain for the residual block, comparing the first value with a predetermined threshold value and selecting one between the space domain and the transform domain according to a comparison result, and encoding the residual block in the selected domain.

In some embodiments, the first value may be a variance.

In some embodiments, the selecting one between the space domain and the transform domain may include selecting the space domain when the first value is greater than the threshold value and selecting the transform domain when the first value is less than the threshold value.

In some embodiments, the selecting one between the space domain and the transform domain may include deciding to transform the residual block into the transform domain, when the first value is less than the threshold value and deciding to skip the transform of the residual block, when the first value is greater than the threshold value.

In some embodiments, the transform domain may be a result of transforming the space domain using one of Hadamard transform, DCT, and DST.

In some embodiments, the encoding the residual block in the selected domain may include transforming the residual block into the selected domain, quantizing the residual block that has been transformed, and entropy coding the residual block that has been quantized.

According to another aspect of the present inventive concepts, there is provided an image encoding apparatus based on a SoC which encodes a residual block of a current block. The image encoding apparatus includes a space variance calculator configured to calculate a variance for the residual block in a space domain, a transform variance calculator configured to calculate a variance for the residual block in a transform domain, a comparator configured to compare the variance for the residual block in the space domain with the variance in the transform domain and decide whether to transform the residual block according to a comparison result, a transform unit configured to transform the residual block into the transform domain according to the decision on whether to transform the residual block, a quantization unit configured to quantize the residual block that has been transformed, and an entropy coding unit configured to perform entropy coding on the residual block that has been quantized.

In some embodiments, the transform unit may skip the transform of the residual block when the variance in the space domain is greater than the variance in the transform domain and may transform the residual block into the transform domain when the variance in the space domain is less than the variance in the transform domain.

According to another aspect of the present inventive concepts, there is provided an image encoding apparatus based on a SoC which encodes a residual block of a current block. The image encoding apparatus includes a first value calculator configured to calculate a first value for the residual block in a first domain, a comparator configured to decide whether to transform the residual block into a second domain different from the first domain according to a size of the first value, and a transform unit configured to transform the residual block into the second domain according to a decision on whether to transform the residual block.

In some embodiments, the image encoding apparatus may further include a second value calculator configured to calculate the second value for the residual block in the second domain. The comparator may compare the first value with the second value and decide whether to transform the residual block according to a comparison result.

In some embodiments, the first domain is a space domain, the second domain is a transform domain, the first value is a sum of absolute differences (SAD), and the second value is a sum of absolute transformed differences (SATD).

In some embodiments, the first domain is a space domain, the second domain is a transform domain, and the first and second values are variances.

In some embodiments, the first value is a variance of the residual block in the transform domain and the comparator compares the first value with a predetermined second value to decide whether to transform the residual block.

In some embodiments, the image encoding apparatus includes a quantization unit configured to quantize the residual block that has been transformed and an entropy coding unit configured to perform entropy coding on the residual block that has been quantized.

In some embodiments, an image decoding apparatus includes the above described image encoding apparatus.

In some embodiments, an image processing system includes the above described image encoding apparatus.

According to another aspect of the present inventive concepts, there is provided an image encoding apparatus based on a system on chip (SoC). The image encoding apparatus includes a prediction unit configured to receive a current block to be encoded and generate a prediction block for the current block to be encoded and a subtractor configured to receive the current block to be encoded and the prediction block and generate a residual block by subtracting the prediction block from the current block to be encoded. The image encoding apparatus further includes a transform skip decision unit configured to receive the residual block, decide whether to transform the residual block into a transform domain and generate a transform skip signal based on the decision and a transform unit configured to transform the residual block into the transform domain, when the transform skip signal is at a first level, and skip transforming the residual block into the transform domain, when the transform skip signal is at a second level.

In some embodiments, the transform skip decision unit includes a space variance calculator configured to calculate a variance for the residual block in a space domain, a transform variance calculator configured to calculate a variance for the residual block in a transform domain, and a comparator configured to compare the variance for the residual block in the space domain with the variance for the residual block in the transform domain and decide whether to transform the residual block according to a comparison result.

In some embodiments, the transform skip decision unit includes a first value calculator configured to calculate a first value for the residual block in a first domain and a comparator configured to decide whether to transform HI the residual block into a second domain different from the first domain according to a size of the first value.

In some embodiments, the transform skip decision unit includes a space variance calculator configured to calculate a first value in a space domain for the residual block and a comparator configured to compare the first value with a predetermined threshold value and selecting one between the space domain and the transform domain according to a comparison result.

In some embodiments, the transform skip decision unit includes a space difference calculator configured to calculate a space distortion for the residual block in a space domain, a transform difference calculator configured to calculate a transform distortion for the residual block in a transform domain and a comparator configured to compare the space distortion for the residual block in the space domain with the transform distortion for the residual block in the transform domain and decide whether to transform the residual block according to a comparison result.

BRIEF DESCRIPTION OF THE DRAWINGS

The foregoing and other features and advantages of the inventive concepts will be apparent from the more particular description of example embodiments of the inventive concepts, as illustrated in the accompanying drawings in which like reference characters refer to the same parts throughout the different views. The drawings are not necessarily to scale, emphasis instead being placed upon illustrating the principles of the inventive concepts:

FIG. 2C is a block diagram of an example embodiment of the encoder illustrated in FIG. 1.

DETAILED DESCRIPTION OF THE EMBODIMENTS

Figure 1:
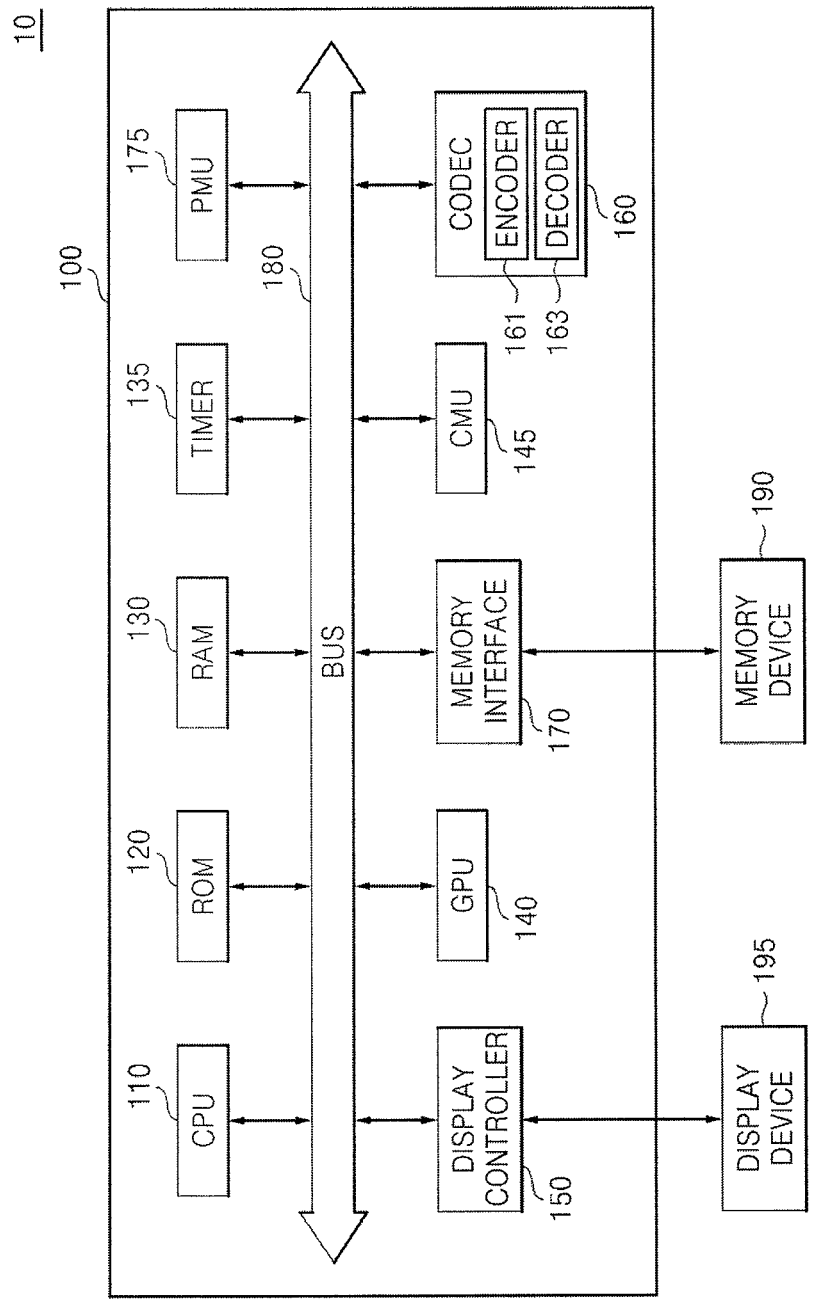
FIG. 1 is a block diagram of an electronic system according to example embodiments of the present inventive concepts.

Various example embodiments will be described more fully hereinafter with reference to the accompanying drawings, in which some embodiments are shown. The present inventive concepts may, however, be embodied in many different forms and should not be construed as limited to the example embodiments set forth herein.

It will be understood that when an element is referred to as being "on," "connected to" or "coupled to" another element or layer, it can be directly on, connected or coupled to the other element or layer or intervening elements or layers may be present. In contrast, when an element or layer is referred to as being "on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the present inventive concepts.

FIG. 1 is a block diagram of an electronic system 10 according to example embodiments of the present inventive concepts. The electronic system 10 may be implemented as a handheld device such as a mobile telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, an e-book, or the like. The electronic system 10 includes a system on chip (SoC) 100, a memory device 190, and a display device 195.

The SoC 100 includes a central processing unit (CPU) 110, a read-only memory (ROM) 120, a random access memory (RAM) 130, a timer 135, a graphics processing unit (GPU) 140, a clock management unit (CMU) 145, a display controller 150, a codec 160, a memory interface 170, and a bus 180. The SoC 100 is not limited thereto; the SoC 100 may also include other elements. The electronic system 10 may also include a power management unit (PMU) 175. The PMU 175 is implemented inside the SoC 100 in the example embodiment illustrated in FIG. 1, but the PMU 175 may be implemented outside the SoC 100 in other embodiments.

The CPU 110, which may be referred to as a processor, may process or execute programs and/or data stored in the memory device 190. The CPU 110 may process or execute the programs and/or the data in response to a clock signal output from a clock signal generator (not shown).

The CPU 110 may be implemented as, for example, a multi-core processor. The multi-core processor may be a single computing component with two or more independent actual processors (referred to as cores). Each of the processors reads and executes program instructions. Since the multi-core processor is able to drive a plurality of accelerators at a time, a data processing system including the multi-core processor is able to perform multi-acceleration.

In some embodiments, the programs and/or the data stored in the ROM 120, the RAM 130, and the memory device 190 may be loaded to a memory in the CPU 110. The ROM 120 may store permanent programs and/or data. The ROM 120 may be implemented as, for example, an erasable programmable ROM (EPROM) or an electrically erasable programmable ROM (EEPROM).

The RAM 130 may temporarily store programs, data, or instructions. The programs and/or data stored in the memory 120 or 190 may be temporarily stored in the RAM 130 according to the control of the CPU 110 or a booting code stored in the ROM 120. The RAM 130 may be implemented as, for example, a dynamic RAM (DRAM) or a static RAM (SRAM).

The GPU 140 processes data read by the memory interface 170 from the memory device 190 into a signal suitable for display. The CMU 145 may generate an operating clock signal and may control the output of the operating clock signal. The CMU 145 may include, for example, a clock generator such as a phase locked loop (PLL), a delay locked loop (DLL), or a crystal oscillator and a clock controller. The CMU 145 may provide the operating clock signal to the elements 110 through 170.

The memory interface 170 interfaces with the memory device 190. The memory interface 170 controls the overall operation of the memory device 190 and controls the overall data exchange between a host and the memory device 190. For example, the memory interface 170 may write data to the memory device 190 or read data from the memory device 190 at the request of the host. The host may be a processing unit, for example, the CPU 110, the GPU 140, or the display controller 150.

The memory device 190 is a storage medium for storing data and may store an operating system (OS) and various kinds of programs and data. The memory device 190 may be, for example, a DRAM; however, the present inventive concepts are not limited thereto. For example, the memory device 190 may be a non-volatile memory, for example, a flash memory, a phase-change RAM (PRAM), a magnetoresistive RAM (MRAM), a resistive RAM (ReRAM) or a ferroelectric RAM (FeRAM). In some embodiments, the memory device 190 may be an embedded memory provided within the SoC 100. The CPU 110, the ROM 120, the RAM 130, the GPU 140, the display controller 150, the codec 160, the memory interface 170, and the PMU 175 may communicate with one another through the bus 180.

The display device 195 may generate a display synchronization signal and may display image signals output from the display controller 150 according to the display synchronization signal. The display synchronous signal may be a vertical synchronization signal (VSYNC). The display device 195 may be implemented as, for example, a liquid crystal display (LCD) device, a light emitting diode (LED) display device, an organic LED (OLED) display device, or an active-matrix OLED (AMOLED) display device. The display controller 150 controls the operation of the display device 195.

The codec 160 may receive an image signal from the memory, that is, the ROM 120, the RAM 130, or the memory device 190 or the GPU 140 and may encode or decode the image signal before outputting it. The codec 160 may include an encoder 161 that encodes an image signal and a decoder 163 that decodes an image signal.

The encoder 161 and the decoder 163 are described hereinafter as being included in the codec 160 of the SoC 100; however, the present inventive concepts are not limited thereto. In some embodiments, only the encoder 161 or only the decoder 163 may be included in the SoC 100. In some embodiments, at least one of the encoder 161 and the decoder 163 may be included in another image processing system different from the one illustrated in FIG. 1.

Figure 2A:
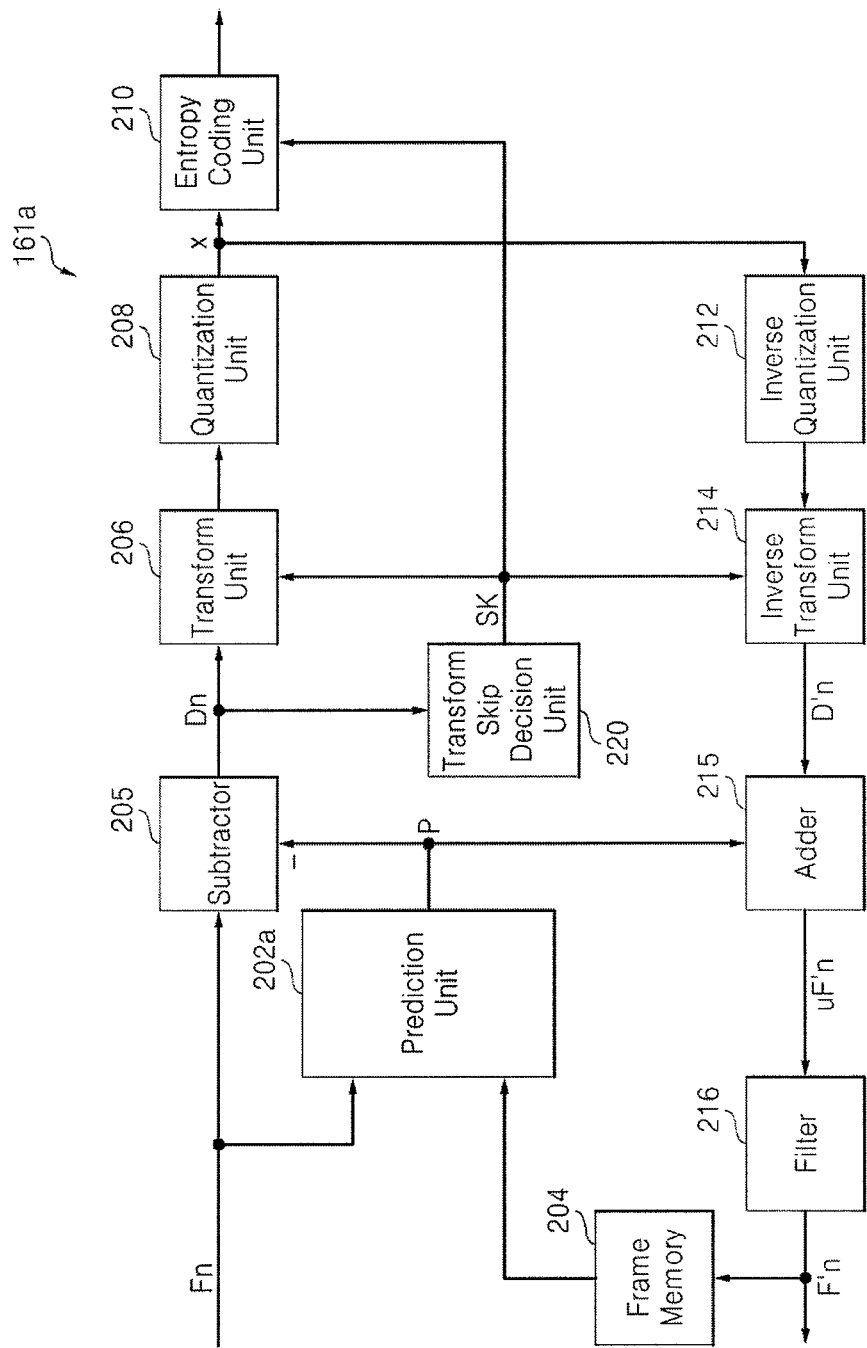
FIG. 2A is a block diagram of an example embodiment of an encoder illustrated in FIG. 1.

FIG. 2A is a block diagram of an example embodiment of an encoder 161a. The encoder 161a may be the encoder 161 illustrated in FIG. 1. Referring to FIG. 2A, the encoder 161a includes a prediction unit 202a, a frame memory 204, a subtractor 205, a transform unit 206, a quantization unit 208, an entropy coding unit 210, an inverse quantization unit 212, an inverse transform unit 214, an adder 215, a filter 216, and a transform skip decision unit 220.

The prediction unit 202a receives the current block Fn and performs inter prediction or intra prediction and generates a prediction block P for a current block Fn to be encoded. In the inter prediction, a block similar to the current block Fn is searched for by referring to reference pictures stored in the frame memory 204. The block found as a search result becomes the prediction block P for the current block Fn. In the intra prediction, intra directional prediction is performed using pixels included in blocks adjacent to the current block Fn that have been encoded before to generate the prediction block P for the current block Fn. The subtractor 205 receives the current block Fn and the predication block P. The subtractor 205 subtracts the prediction block P from the current block Fn. The subtractor 205 outputs the result of the subtraction as a residual block Dn.

The transform unit 206 may receive the residual block Dn from the subtractor 205 and orthogonally transform the residual block Dn into a frequency domain. That is, the transform unit 206 may generate a transform coefficient by transforming a residual value for each pixel included in the residual block Dn. Specifically, the transform unit 206 may perform discrete cosine transform (DCT) on a residual value for each pixel included in the residual block Dn to generate a discrete cosine coefficient. While the example embodiment is described as performing the DCT, the present inventive concepts are not limited thereto. In some embodiments, a Hadamard transform or discrete sine transform (DST) may be used.

The quantization unit 208 may receive the discrete cosine coefficients generated in the transform unit 206 and quantize the discrete cosine coefficients using a predetermined quantization coefficient of Qp. The entropy coding unit 210 may receive the quantized discrete cosine coefficients "x" from the quantization unit 208, perform entropy coding on the quantized discrete cosine coefficients "x" and, then, insert them into a bitstream.

The inverse quantization unit 212 may receive the quantized discrete cosine coefficients "x" generated by the quantization unit 208. The quantized discrete cosine coefficients "x" may be inverse quantized by the inverse quantization unit 212. The inverse transform unit 214 may receive the inverse quantized discrete cosine coefficients "x" generated by the inverse quantization unit 212 and may reconstruct the inverse quantized discrete cosine coefficients "x" to generate a residual block D'n. The adder 215 may receive the residual block D'n generated by the inverse transform unit 214 and the prediction block P generated by the prediction unit 202a. The adder 215 may add the reconstructed residual block D'n to the prediction block P. The adder 215 may generate an added block uF'n.

The filter 216 may receive the added block uF'n generated by the adder 215 and may generate a reconstructed current block F'n by deblocking-filtering the added block uF'n. The reconstructed current block F'n may be received by and stored in the frame memory 204 to be used for inter prediction or intra prediction of a subsequent block by the prediction unit 202a. The prediction unit 202a may receive the reconstructed current block F'n from the frame memory 204.

The transform skip decision unit 220 may receive the residual block Dn generated by the subtractor 205. The transform skip decision unit 220 may calculate a first value for the residual block Dn in a space domain and may decide whether to transform the residual block Dn into a transform domain based on the size of the first value.

In some embodiments, the transform skip decision unit 220 may calculate the first value for the residual block Dn in the space domain and a second value corresponding to the first value in the transform domain. The first and second values may be distortion values, which may be calculated based on a difference between the current block Fn and the prediction block P. For instance, the first value may be the sum of squared differences (SSD) or the sum of absolute differences (SAD) and the second value may be the sum of absolute transformed differences (SATD). However, the present inventive concepts are not limited thereto. In some embodiments, the first and second values may be a variance.

The transform skip decision unit 220 may compare the first value with the second value. In some embodiments, the transform skip decision unit 220 may compare the first value with at least one predetermined threshold value. The first value may be a variance, but the present inventive concepts are not limited thereto.

The transform skip decision unit 220 may generate a transform skip signal SK according to the comparison result. The transform skip signal SK may indicate whether to perform a transform or an inverse transform on the residual block Dn. The transform skip decision unit 220 provides the transform skip signal SK to the transform unit 206, the inverse transform unit 214 and the entropy coding unit 210.

The transform unit 206 may skip or perform the transform according to the transform skip signal SK. When the transform is skipped, the residual block Dn may be encoded (for example, entropy encoded) in the space domain. When the transform is not skipped, the residual block Dn may be encoded in the transform domain (for example, a frequency domain). Hereinafter, a domain in which the residual block Dn is encoded is defined as a coding domain. That is, the coding domain for the residual block Dn may be the space domain or the transform domain and may be determined by the transform skip signal SK.

According to example embodiments of the present inventive concepts, the entropy coding unit 210 may perform entropy coding on the transform skip signal SK and, then, insert it into a bitstream. The inverse transform unit 214 may skip or perform inverse transform according to the transform skip signal SK.

Figure 2B:
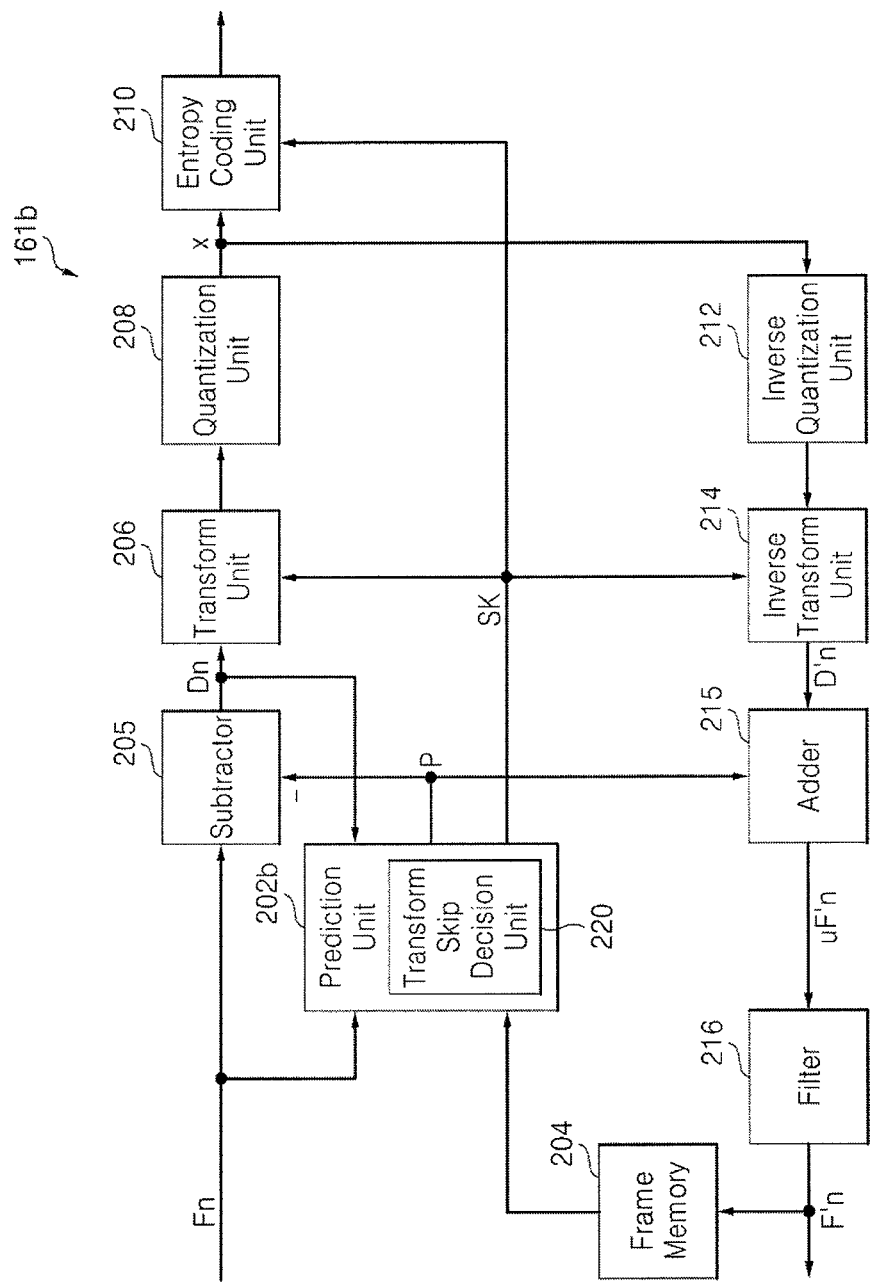
FIG. 2B is a block diagram of an example embodiment of the encoder illustrated in FIG. 1.

FIG. 2B is a block diagram of an encoder 161b according to an example embodiment of the present inventive concepts. The encoder 161b may be the encoder 161 illustrated in FIG. 1. Since the structure of the encoder 161b illustrated in FIG. 2B is nearly the same as that of the encoder 161a illustrated in FIG. 2A, differences between the encoders 161a and 161b will be mainly described.

Referring to FIGS. 2A and 2B, the transform skip decision unit 220 may be included in a prediction unit 202b. The prediction unit 202b receives the current block Fn and performs inter prediction or intra prediction and generates a prediction block P for a current block Fn to be encoded and may provide the prediction block P to the subtractor 205 and the adder 215. The prediction unit 202b may receive the residual block Dn. The transform skip decision unit 220 may calculate a first value for the residual block Dn generated by the subtractor 205 in the space domain. The transform skip decision unit 220 may generate the transform skip signal SK for determining whether to transform the residual block Dn into the transform domain according to the size of the first value. The prediction unit 202b having the transform skip decision unit 220 may provide the transform skip signal to the transform unit 206, the inverse transform unit 214 and the entropy coding unit 210.

FIG. 2C is a block diagram of an encoder 161c according to an example embodiment of the present inventive concepts. The encoder 161c may be the encoder 161 illustrated in FIG. 1. Since the structure of the encoder 161c illustrated in FIG. 2C is nearly the same as that of the encoder 161a illustrated in FIG. 2A, differences between the encoders 161a and 161c will be mainly described. Referring to FIG. 2C, the transform skip decision unit 220 may transmit the transform skip signal SK only to the transform unit 206. That is, according to the example embodiment of FIG. 2C, the transform skip signal SK is not transmitted to the entropy coding unit 210 or the inverse transform unite 214. Thereafter, a signal transmitted from the transform unit 206 to the quantization unit 208, the entropy coding unit 210, and the inverse quantization unit 212 may include transform skip/non-skip information.

Figure 2D:
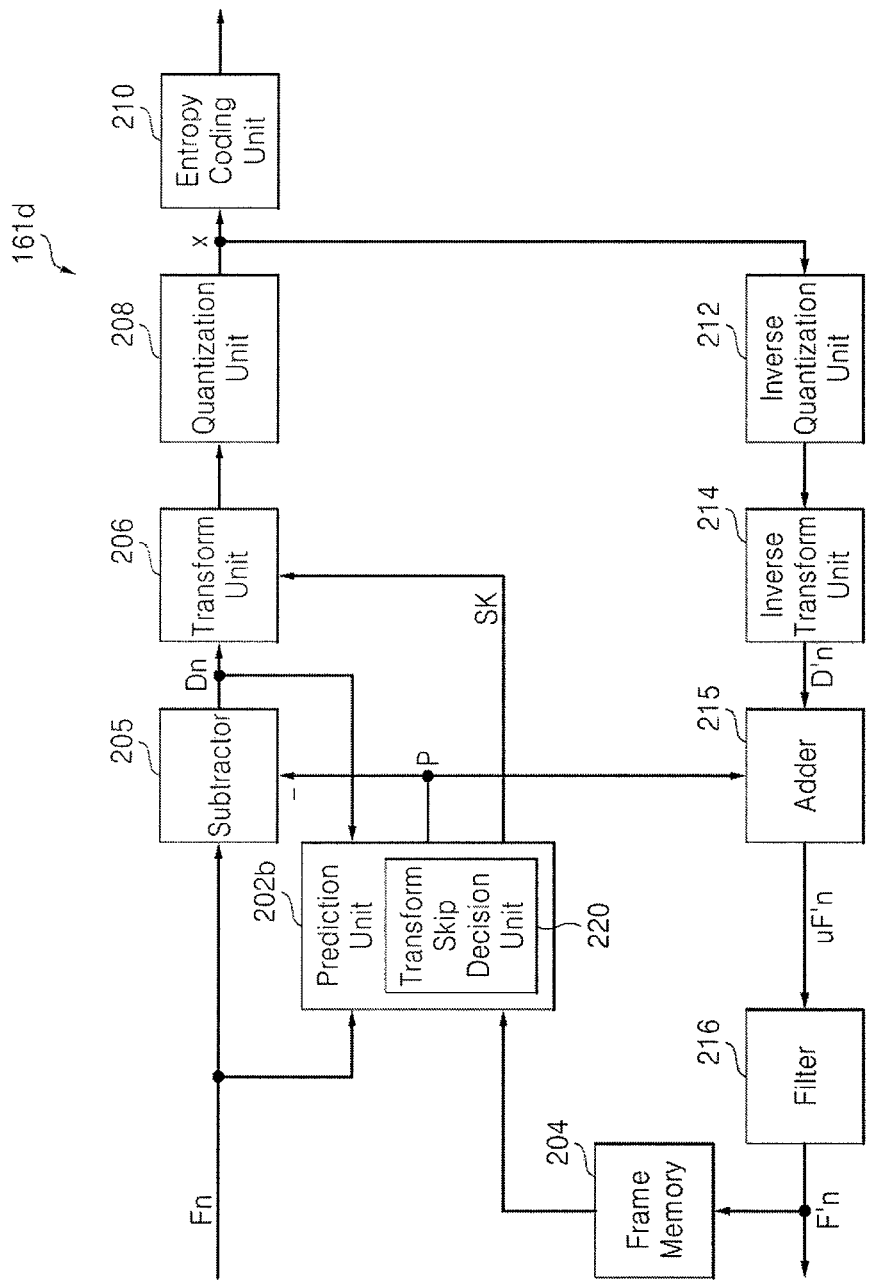
FIG. 2D is a block diagram of an example embodiment of the encoder illustrated in FIG. 1.

FIG. 2D is a block diagram of an encoder 161d according to an example embodiment of the present inventive concepts. The encoder 161d may be the encoder 161 illustrated in FIG. 1. Since the structure of the encoder 161d illustrated in FIG. 2D is nearly the same as that of the encoder 161b illustrated in FIG. 2B, differences between the encoders 161b and 161d will be mainly described. Referring to FIG. 2D, the transform skip decision unit 220 may transmit the transform skip signal SK only to the transform unit 206. That is, according to the example embodiment of FIG. 2D, the transform skip signal SK is not transmitted to the entropy coding unit 210 or the inverse transform unite 214. Thereafter, a signal transmitted from the transform unit 206 to the quantization unit 208, the entropy coding unit 210, and the inverse quantization unit 212 may include transform skip/non-skip information.

Figure 3:
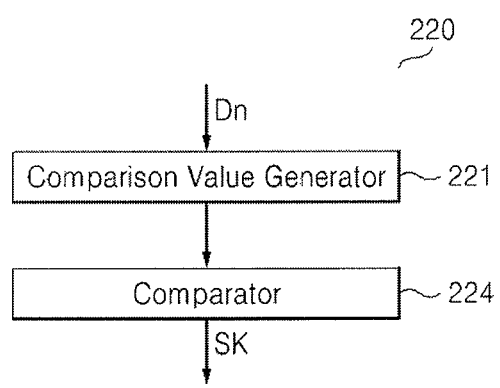
FIG. 3 is a block diagram of an example embodiment of a transform skip decision unit illustrated in FIGS. 2A through 2D.

FIG. 3 is a block diagram of the transform skip decision unit 220 illustrated in FIGS. 2A through 2D. Referring to FIG. 3, the transform skip decision unit 220 may include a comparison value generator 221 and a comparator 224.

The comparison value generator 221 may receive the residual block Dn and calculate a first value in the space domain for the residual block Dn. The first value may be a difference or variance, but the present inventive concepts are not limited thereto.

The comparator 224 may receive the first value generated by comparison value generator 221 and generate and output the transform skip signal SK for determining whether to transform the residual block Dn into the transform domain according to the size of the first value.

In some embodiments, the comparison value generator 221 may output the first value and a second value to be compared with the first value to the comparator 224. The comparator 224 may compare the first value with the second value and may generate the transform skip signal SK according to the comparison result. The second value may be a value, for example, difference or variance, corresponding to the first value in the transform domain for the residual block Dn or a pre-stored value.

Figure 4:
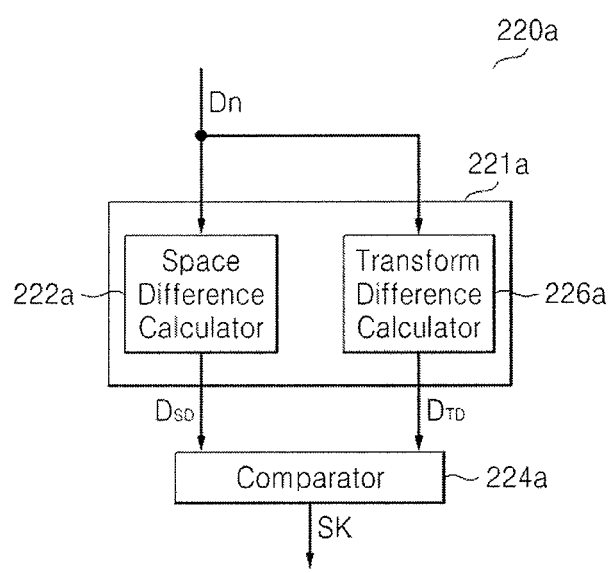
FIG. 4 is a block diagram of an example embodiment of the transform skip decision unit illustrated in FIG. 3.

FIG. 4 is a block diagram of a transform skip decision unit 220a. The transform skip decision unit 220a may be the transform skip decision unit 220 illustrated in FIG. 3. Referring to FIGS. 2A through 2D and FIG. 4, the transform skip decision unit 220a may include a comparison value generator 221a and a comparator 224a. The comparison value generator 221a may include a space difference calculator 222a and a transform difference calculator 226a.

The space difference calculator 222a may receive the residual block Dn and calculate a space distortion $D_{SD}$ in the space domain for the residual block Dn. The space distortion $D_{SD}$ may be the SSD or the SAD.

The transform difference calculator 226a may receive the residual block Dn and calculate a transform distortion $D_{TD}$ in the transform domain for the residual block Dn. The transform distortion $D_{TD}$ may be the SATD. The transform domain may be a result of transforming the space domain using Hadamard transform, DCT, or DST.

The comparator 224a may receive the space distortion $D_{SD}$ and the transform distortion $D_{TD}$. The comparator 224a may compare the space distortion $D_{SD}$ with the transform distortion $D_{TD}$ and may decide whether to transform the residual block Dn into the transform domain according to the comparison result. For example, the comparator 224a may generate and output the transform skip signal SK indicating whether to skip the transform according to the comparison result.

The comparator 224a may determine the coding domain for the residual block Dn based on a result of comparing the space distortion $D_{SD}$ with the transform distortion $D_{TD}$ using the following formula:

$$\alpha_1 > D_{SD} + \beta_1 < \alpha_2 > D_{TD} + \beta_2,$$

where $\alpha_1$, $\beta_1$, $\alpha_2$, and $\beta_2$ may be predetermined values.

The coding domain is determined to be the space domain when the formula is satisfied and is determined to be the transform domain when the formula is not satisfied. For example, the comparator 224a may output the transform skip signal SK at a first level when the condition of the formula is not satisfied and may output the transform skip signal SK at a second level when the condition of the formula is satisfied.

The transform unit 206 may transform the residual block Dn into the transform domain, when the transform skip signal SK is at the first level, and may skip the transform and output the residual block Dn without transforming the residual block Dn, when the transform skip signal SK is at the second level.

Figure 5:
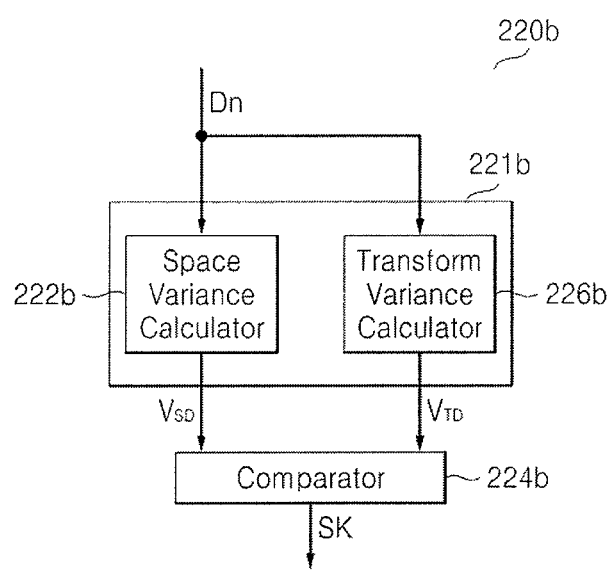
FIG. 5 is a block diagram of an example embodiment of the transform skip decision unit illustrated in FIG. 3.

FIG. 5 is a block diagram of a transform skip decision unit 220b according to an example embodiment of the present inventive concepts. The transform skip decision unit 220b may be the transform skip decision unit 220 illustrated in FIG. 3. Referring to FIG. 5, the transform skip decision unit 220b may include a comparison value generator 221b and a comparator 224b. The comparison value generator 221b may include a space variance calculator 222b and a transform variance calculator 226b.

The space variance calculator 222b may receive the residual block Dn and calculate a variance (hereinafter, referred to as a space variance) $V_{SD}$ in the space domain for the residual block Dn. The transform variance calculator 226b may receive the residual block Dn and calculate a variance (hereinafter, referred to as a transform variance) $V_{TD}$ in the transform domain for the residual block Dn. The transform domain may be a result of transforming the space domain using Hadamard transform, DCT, or DST.

The comparator 224b may receive the space variance $V_{SD}$ with the transform variance $V_{TD}$. The comparator 224b may compare the space variance $V_{SD}$ with the transform variance $V_{TD}$ and may decide whether to transform the residual block Dn into the transform domain according to the comparison result. For example, the comparator 224b may generate and output the transform skip signal SK indicating whether to skip the transform according to the comparison result.

The comparator 224b may decide to transform the residual block Dn into the transform domain when the space variance $V_{SD}$ is less than the transform variance $V_{TD}$ and may decide to skip the transform when the space variance $V_{SD}$ is greater than the transform variance $V_{TD}$. That is, the comparator 224b may output the transform skip signal SK at a first level indicating a transform skip when the space variance $V_{SD}$ is greater than the transform variance $V_{TD}$ and may output the transform skip signal SK at a second level indicating a transform non-skip when the space variance $V_{SD}$ is less than the transform variance $V_{TD}$.

Figure 6:
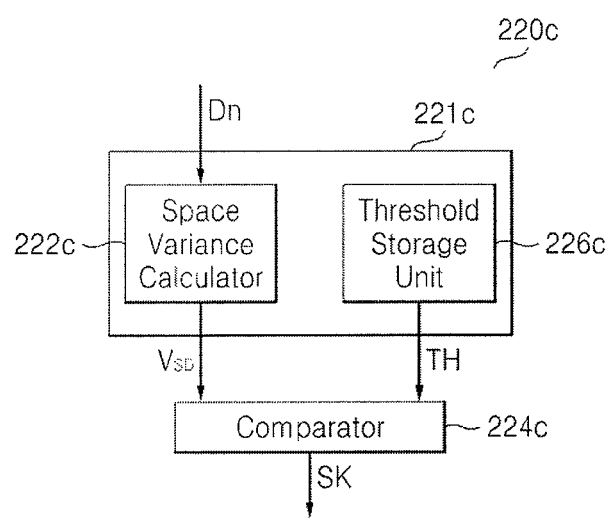
FIG. 6 is a block diagram of an example embodiment of the transform skip decision unit illustrated in FIG. 3.

FIG. 6 is a block diagram of a transform skip decision unit 220c according to an example embodiment of the present inventive concepts. The transform skip decision unit 220c may be the transform skip decision unit 220 illustrated in FIG. 3. Referring to FIG. 6, the transform skip decision unit 220c may include a comparison value generator 221c and a comparator 224c. The comparison value generator 221c may include a space variance calculator 222c and a threshold storage unit 226c.

The space variance calculator 222c may receive the Dn and calculate the space variance $V_{SD}$ in the space domain for the residual block Dn. The threshold storage unit 226c may store a predetermined threshold value TH. According to embodiments, the threshold value TH may be a pre-stored value or a value varying with an external input.

The comparator 224c may receive the space variance $V_{SD}$ with the threshold value TH and compare the space variance $V_{SD}$ with the threshold value TH and may determine the coding domain for the residual block Dn according to the comparison result. That is, the comparator 224c may decide whether to transform the residual block Dn into the frequency domain according to the comparison result. The coding domain may be determined to be the space domain when the space variance $V_{SD}$ is greater than the threshold value TH and may be determined to be the transform domain when the space variance $V_{SD}$ is less than the threshold value TH. The comparator 224c may generate and output the transform skip signal SK indicating transform skip/non-skip according to the comparison result. That is, the comparator 224c may output the transform skip signal SK at a first level indicating a transform skip when the coding domain is determined to be in the space domain, and may output the transform skip signal SK at a second level indicating a transform non-skip when the coding domain is determined to be the transform domain.

Figure 7:
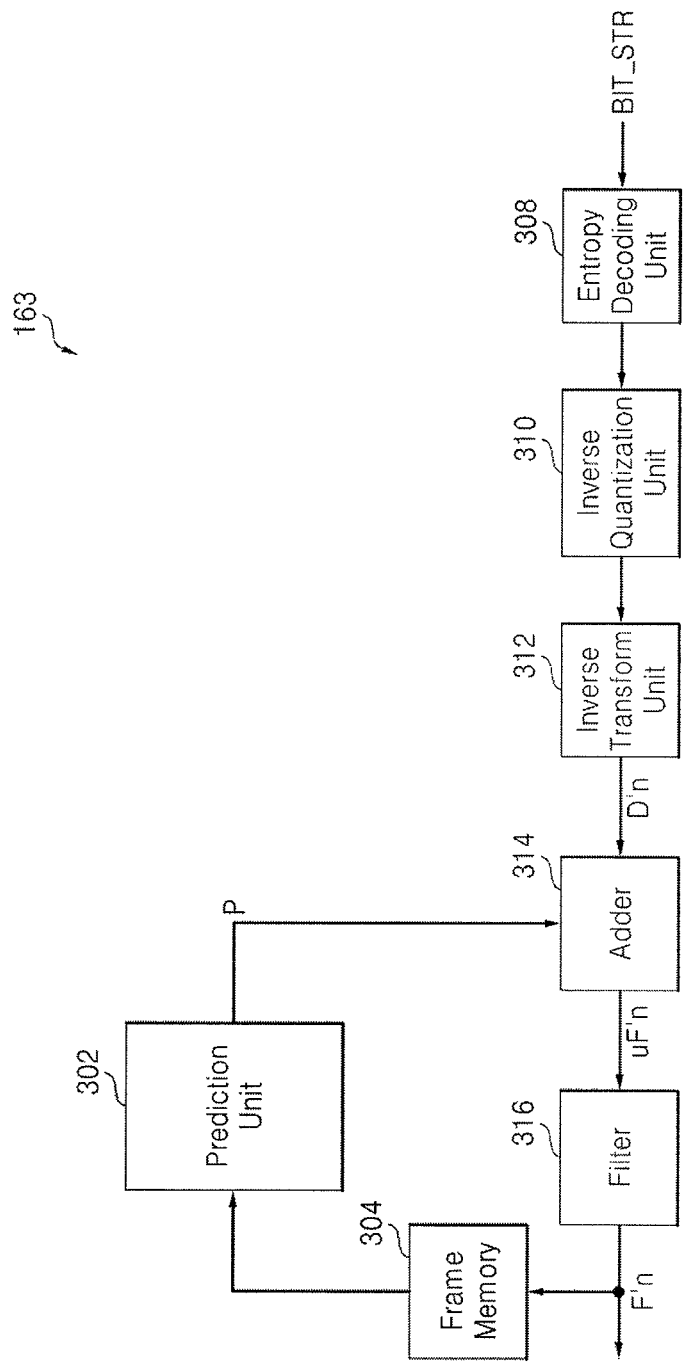
FIG. 7 is a block diagram of a decoder according to example embodiments of the present inventive concepts.

FIG. 7 is a block diagram of the decoder 163 of FIG. 1 according to example embodiments of the present inventive concepts. Referring to FIG. 7, the decoder 163 may include a prediction unit 302, a frame memory 304, an entropy decoding unit 308, an inverse quantization unit 310, an inverse transform unit 312, an adder 314, and a filter 316.

The prediction unit 302 may generate a prediction block P for a current block to be decoded by performing inter prediction or intra prediction. The frame memory 304 provides reference pictures stored in the frame memory to the prediction unit 302. The prediction unit 302 may perform the inter prediction or the intra prediction using the reference pictures stored in the frame memory 304 or pixels included in blocks adjacent to the current block that have been encoded before.

The entropy decoding unit 308 may externally receive a bitstream BIT_STR. The bitstream BIT_STR may include transform skip/non-skip information, for example, the transform skip signal SK that has been encoded. The entropy decoding unit 308 may perform entropy decoding on the bitstream BIT_STR to generate a transform coefficient.

The inverse quantization unit 310 may receive the transform coefficient from the entropy decoding unit 308 and inverse quantize transform coefficients that have been generated by the entropy decoding unit 308 through entropy decoding. The inverse quantization unit 310 may provide the inverse quantized transform coefficients to the inverse transform unit 312. The inverse transform unit 312 may generate the reconstructed residual block D'n by performing an inverse transform on the transform coefficients that have been inverse quantized by the inverse quantization unit 310 according to the transform skip signal SK.

The inverse transform unit 312 may inverse transform an inverse-quantized transform coefficient when the transform skip signal SK is at the first level and may skip the inverse transform when the transform skip signal SK is at the second level. Alternatively, the inverse transform unit 312 may inverse transform an inverse-quantized transform coefficient when the transform skip signal SK is at the second level and may skip the inverse transform when the transform skip signal SK is at the first level. The inverse transform may be, for example, Hadamard transform, DCT, or DST.

The adder 314 may receive the prediction block P generated by the prediction unit 302 and the reconstructed residual block D'n generated by the inverse transform unit 312. The adder 314 may generate the reconstructed current block uF'n by adding the reconstructed residual block D'n and the prediction block P generated by the prediction unit 302. The filter 316 may receive the reconstructed current block uF'n from the adder 314. The reconstructed current block uF'n may be deblocking-filtered by the filter 316 and then the deblocking-filtered block F'n may be stored in the frame memory 304 to be used for the prediction of a subsequent picture or block.

Figure 8:
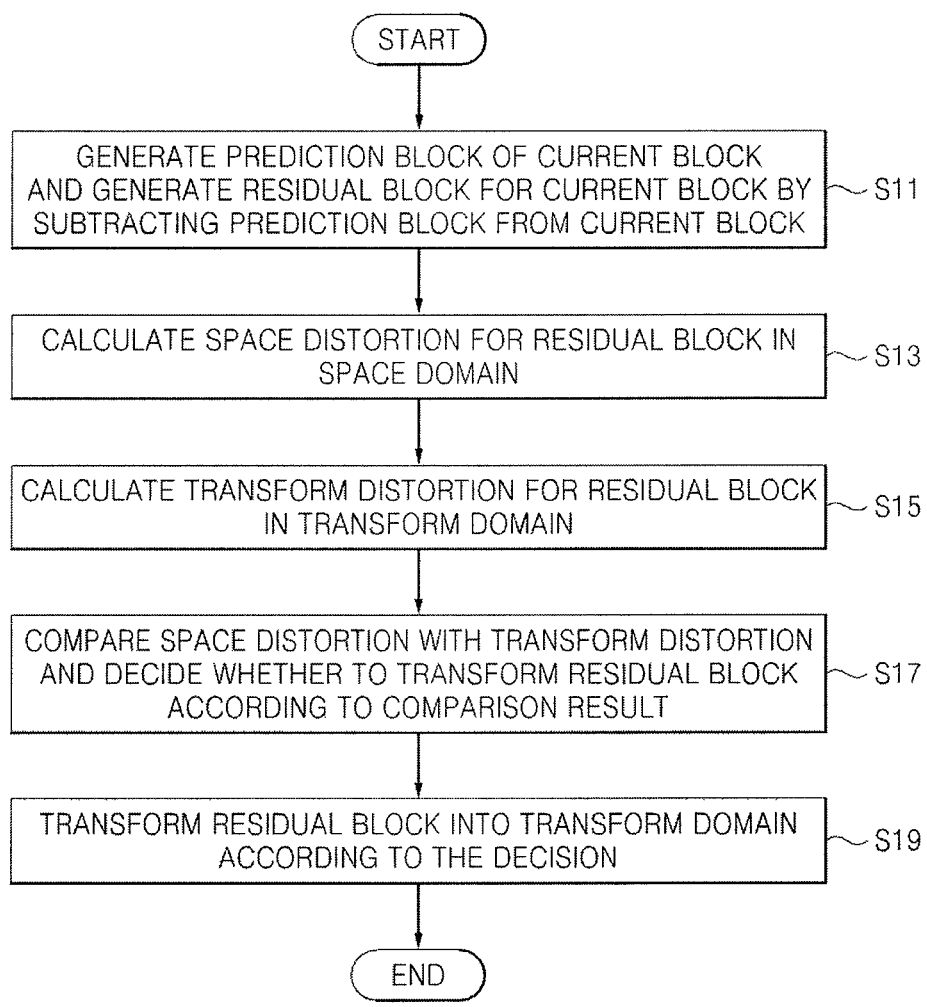
FIG. 8 is a flowchart of a method of encoding an image according to example embodiments of the present inventive concepts.

FIG. 8 is a flowchart of a method of encoding an image according to example embodiments of the present inventive concepts. Referring to FIGS. 2A, 4, and 8, the prediction unit 202a may generate the prediction block P for the current block Fn and the subtractor 205 may generate the residual block Dn for the current block Fn by subtracting the prediction block P from the current block Fn in operation S11.

The space difference calculator 222a may calculate the space distortion $D_{SD}$ for the residual block Dn in the space domain in operation S13.

The transform difference calculator 226a may calculate the transform distortion $D_{TD}$ for the residual block Dn in the transform domain in operation S15.

The comparator 224a may compare the space distortion $D_{SD}$ with the transform distortion $D_{TD}$ in operation S17. The comparator 224a may decide whether to transform the residual block Dn according to the comparison result in operation S17. The comparator 224a may output the transform skip signal SK indicating the decision on whether to transform the residual block Dn.

The transform unit 206 may transform the residual block Dn into the transform domain according to the decision on whether to perform the transform in operation S19. That is, in operation S19, the transform unit 206 may transform the residual block Dn into the transform domain according to the transform skip signal SK.

Figure 9:
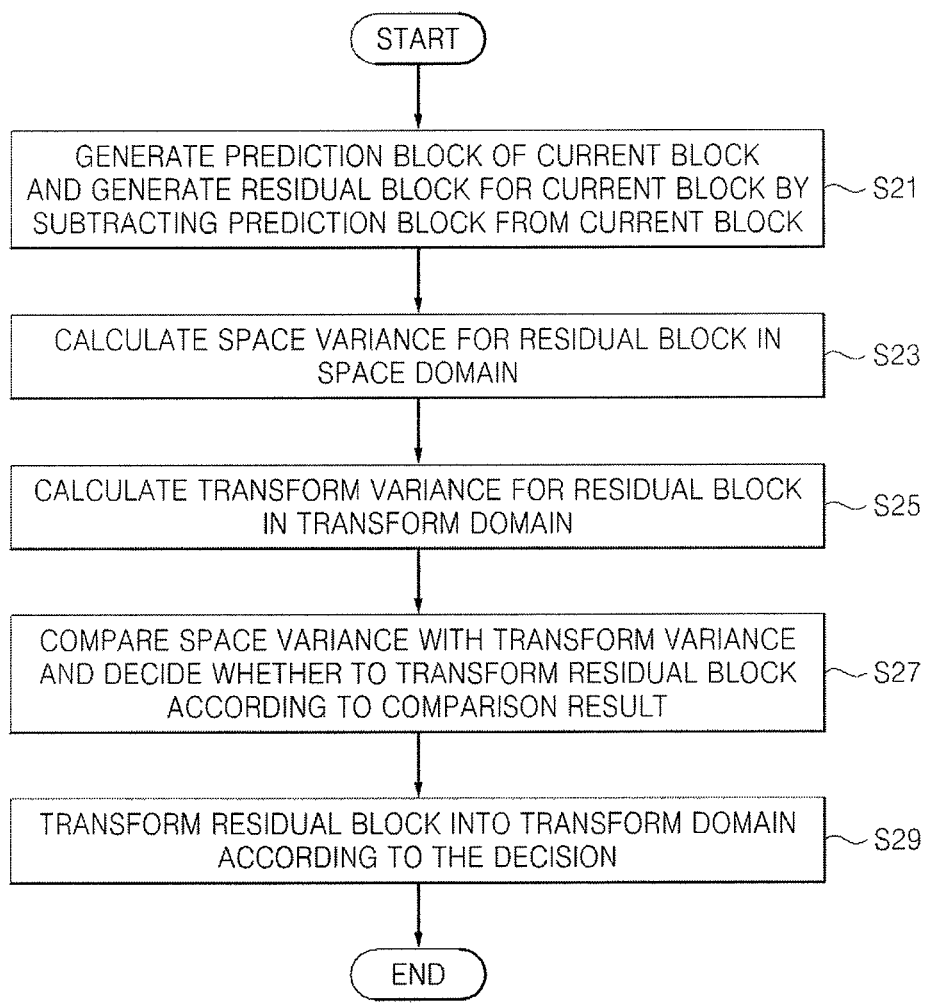
FIG. 9 is a flowchart of a method of encoding an image according to example embodiments of present inventive concepts.

FIG. 9 is a flowchart of a method of encoding an image according to example embodiments of the present inventive concepts. Referring to FIGS. 2A, 5, and 9, the prediction unit 202a may generate the prediction block P for the current block Fn and the subtractor 205 may generate the residual block Dn for the current block Fn by subtracting the prediction block P from the current block Fn in operation S21.

The space variance calculator 222b may calculate the space variance $V_{SD}$ for the residual block Dn in the space domain in operation S23.

The transform variance calculator 226b may calculate the transform variance $V_{TD}$ for the residual block Dn in the transform domain in operation S25.

The comparator 224b may compare the space variance $V_{SD}$ with the transform variance $V_{TD}$ in operation S27. The comparator 224b may decide whether to transform the residual block Dn according to the comparison result in operation S27. The comparator 224b may output the transform skip signal SK indicating the decision on whether to transform the residual block Dn.

The transform unit 206 may transform the residual block Dn into the transform domain according to the decision on whether to perform the transform in operation S29. That is, in operation S29, the transform unit 206 may transform the residual block Dn into the transform domain according to the transform skip signal SK.

Figure 10:
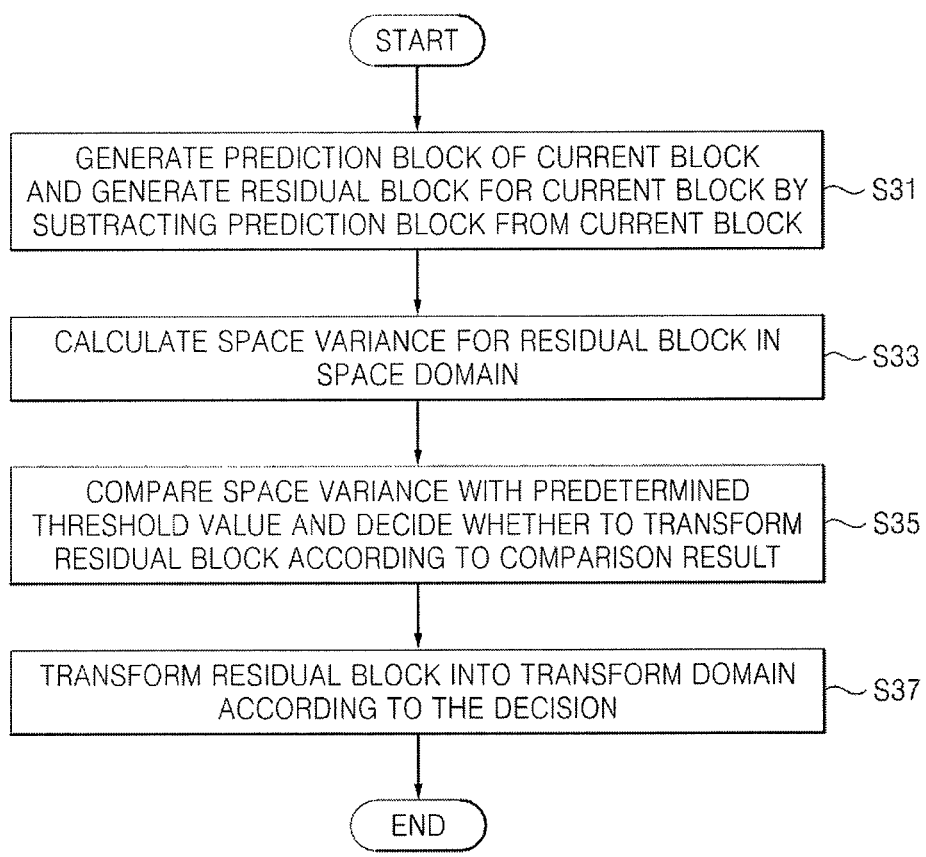
FIG. 10 is a flowchart of a method of encoding an image according to example embodiments of the present inventive concepts.

FIG. 10 is a flowchart of a method of encoding an image according to example embodiments of the present inventive concepts. Referring to FIGS. 2A, 6, and 10, the prediction unit 202a may generate the prediction block P for the current block Fn and the subtractor 205 may generate the residual block Dn for the current block Fn by subtracting the prediction block P from the current block Fn in operation S31.

The space variance calculator 222c may calculate the space variance $V_{SD}$ for the residual block Dn in the space domain in operation S33.

The comparator 224c may compare the space variance $V_{SD}$ with the predetermined threshold value TH, in operation S35. The comparator 224c may decide whether to transform the residual block Dn according to the comparison result in operation S35. The comparator 224c may output the transform skip signal SK indicating the decision on whether to transform the residual block Dn.

The transform unit 206 may transform the residual block Dn into the transform domain according to the decision on whether to perform the transform in operation S37. That is, in operation S37, the transform unit 206 may transform the residual block Dn into the transform domain according to the transform skip signal SK.

Figure 11:
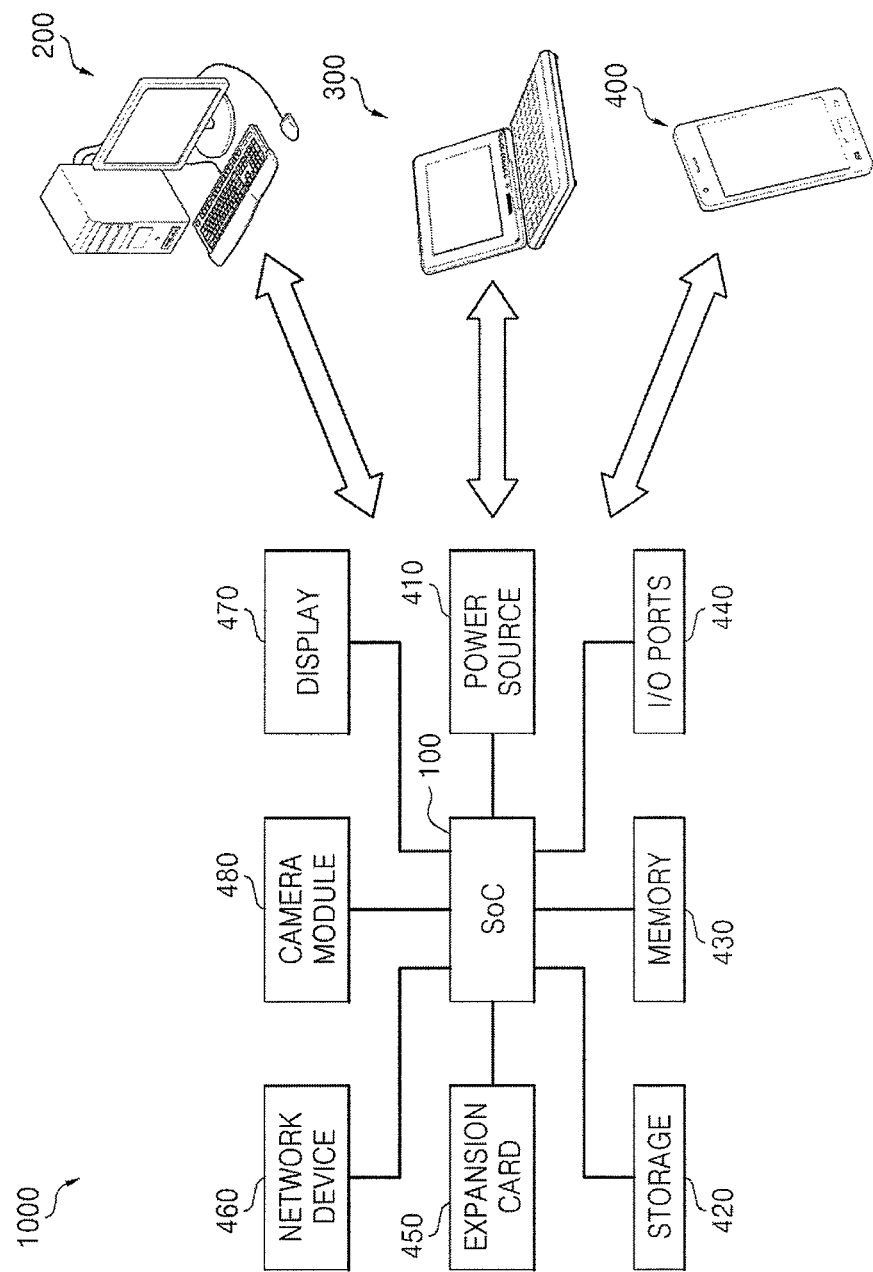
FIG. 11 is a block diagram of an electronic system including an SoC illustrated in FIG. 1 according to example embodiments of the present inventive concepts.

FIG. 11 is a block diagram of an electronic system 1000 including the SoC illustrated in FIG. 1. Referring to FIG. 11, the electronic system 1000 may be implemented as a PC or a data server 200, a laptop computer 300, a portable device 400, or the like.

The portable device 400 may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, an e(electronic)-book device, or the like.

The electronic system 1000 may include the SoC 100, a power source 410, a storage device 420, a memory 430, I/O ports 440, an expansion card 450, a network device 460, and a display 470. The electronic system 1000 may further include a camera module 480.

The SoC 100 may be, for example, the SoC 100 illustrated in FIG. 1.

The SoC 100 may control the operation of at least one of the elements 410 through 480. The power source 410 may supply an operating voltage to at least one of the elements of SOC 100, the storage device 420, the memory 430, the I/O ports 440, the expansion card 450, the network device 460, the display device 470 and the camera module 480. The storage device 420 may be implemented by a hard disk drive (HDD) or a solid state drive (SSD).

The memory 430 may be implemented by a volatile or non-volatile memory. The memory 430 may correspond to the memory device 190 illustrated in FIG. 1. A memory controller (not shown) that controls a data access operation, for example, a read operation, a write operation (or a program operation), or an erase operation, on the memory 430 may be integrated into or embedded in the SoC 100. Alternatively, the memory controller may be provided between the SoC 100 and the memory 430.

The I/O ports 440 may be ports that receive data transmitted to the electronic system 1000 or transmit data from the electronic system 1000 to an external device. For example, the I/O ports 440 may include a port connecting with a pointing device such as a computer mouse, a port connecting with a printer, and a port connecting with a USB drive.

The expansion card 450 may be implemented as, for example, a secure digital (SD) card or a multimedia card (MMC). The expansion card 450 may be a subscriber identity module (SIM) card or a universal SIM (USIM) card.

The network device 460 enables the electronic system 1000 to be connected with a wired or wireless network. The display 470 displays data output from the storage device 420, the memory 430, the I/O ports 440, the expansion card 450, or the network device 460.

The camera module 480 may convert optical images into electrical images. Accordingly, the electrical images output from the camera module 480 may be stored in the storage device 420, the memory 430, or the expansion card 450. Also, the electrical images output from the camera module 480 may be displayed through the display 470.

Figure 12:
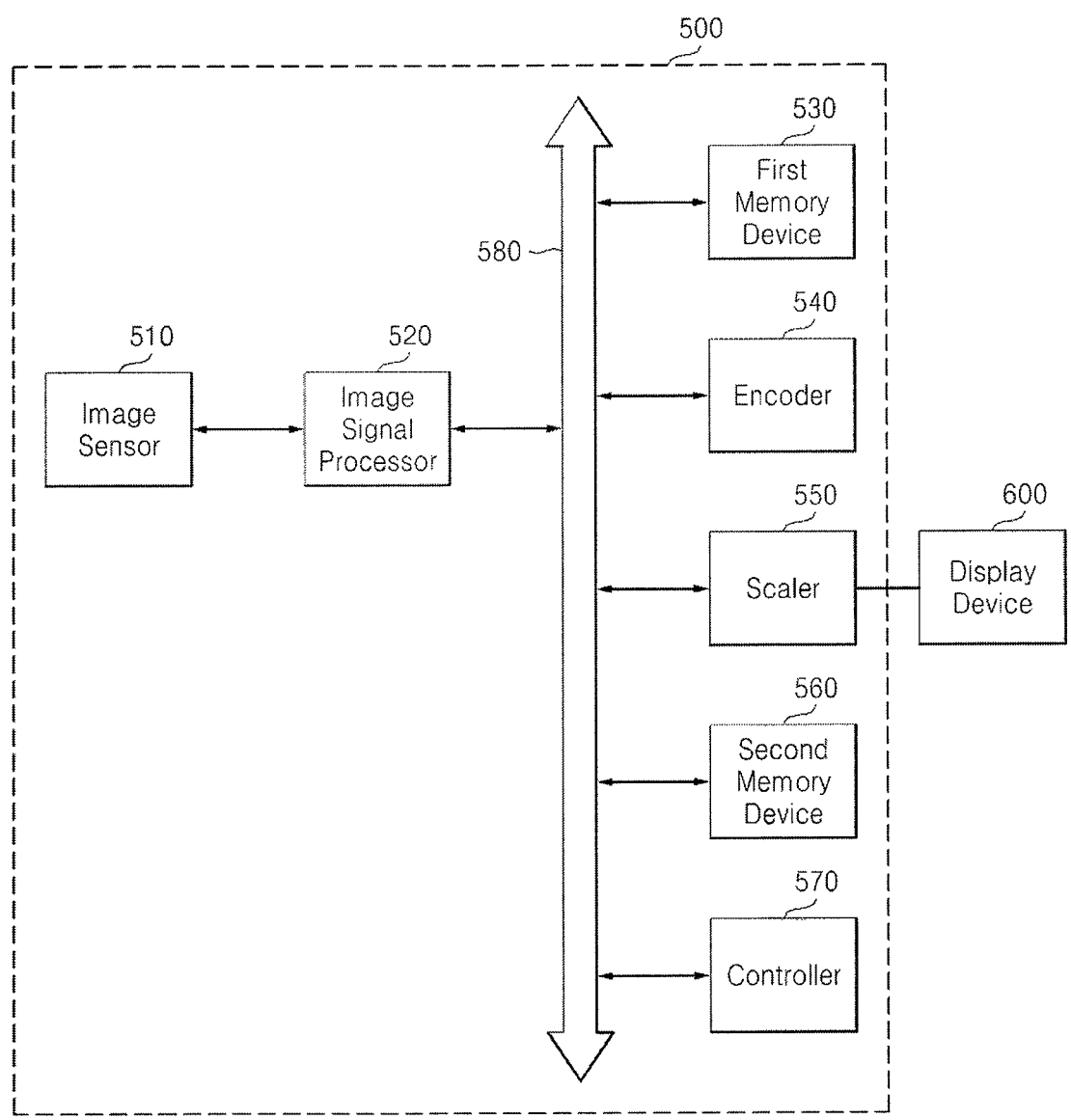
FIG. 12 is a block diagram of a camera module including one of the encoders illustrated in FIGS. 2A through 2D according to example embodiments of the present inventive concepts.

FIG. 12 is a block diagram of a camera module 500 including one of the encoders 161a through 161d illustrated in FIGS. 2A through 2D, respectively. Referring to FIG. 12, the camera module 500 includes an image sensor 510, an image signal processor 520, a first memory device 530, an encoder 540, a scaler 550, a second memory device 560, a controller 570, and a system bus 580.

The image sensor 510 may convert an optical signal received through a lens into an electrical signal, thereby generating full-size image data. The full size is an actual pixel size.

The image signal processor 520 corrects the full-size image data received from the image sensor 510. For example, the image signal processor 520 performs shake correction and hue correction on the image data and adjusts the white balance of the image data. Digital image stabilization (DIS), electrical image stabilization (EIS), or optical image stabilization (OIS), for example, may be used for the shake correction.

The first memory device 530 periodically receives and stores the image data from the image signal processor 520 via the system bus 580. The first memory device 530 may store the image data in various formats. For instance, the first memory device 530 may store the image data in CMYK format, HSV format, CIE format, YUV (analog YPbPr or digital YCbCr) format, or the like.

The encoder 540 may be the encoder 161a illustrated in FIG. 2A, the encoder 161b illustrated in FIG. 2B, the encoder 161c illustrated in FIG. 2C or the encoder 161d illustrated in FIG. 2D. The encoder 540 may receive the image data from the first memory device 530 via the system bus 580 and may convert the image data into a compressed file in a predetermined format at the opening of a shutter (for example, when a user presses down a shutter button), but the present inventive concepts are not limited thereto. The encoder 540 may convert YCbCr format image data stored in the first memory device 530 into a JPEG file.

The scaler 550 adjusts the size of an image received from the first memory device 530 via the system bus 580. The scaler 550 may adjust the image to a size suitable for a display device 600. The scaler 550 outputs the image to the display device 600.

The second memory device 560 stores the JPEG file generated in the encoder 540 at the opening of the shutter. At this time, the second memory device 560 may transmit the JPEG file to a separate memory through a first interface (not shown).

Although the second memory device 560 is included within the camera module 500 in the embodiments illustrated in FIG. 11, the present inventive concepts are not limited thereto. In some embodiments, the second memory device 560 may be a separate storage device, for example, an external NAND flash memory.

The controller 570 may control the image data, for example, YCbCr format data, stored in the first memory device 530 to be output to the encoder 540. The controller 570 may be provided outside or inside the camera module 500 and may be implemented by, for example, a general purpose input/output (GPIO) port or an analog-to-digital converter (ADC), but the present inventive concepts are not limited thereto. The controller 570 may control image data to be stored in different formats in the first memory device 530 at a same time.

The camera module 500 may be used for camera phones, digital single-lens reflex (DSLR) cameras, SLR cameras, or the like.

As described above, according to some embodiments of the present inventive concepts, whether a transform is to be skipped during an encoding process is decided without complex reconstruction processes. Thus, the quality of pictures and rate-distortion (RD) performance are increased.

While the present inventive concepts have been particularly shown and described with reference to example embodiments thereof, it will be understood by those of ordinary skill in the art that various changes in forms and details may be made therein without departing from the spirit and scope of the present inventive concepts as defined by the following claims.

What is claimed is:

1. An image encoding method based on a system on chip (SoC) which encodes a residual block of a current block, the image encoding method comprising:
   generating a first value based on the residual block;
   comparing the first value with a second value and deciding whether to transform the residual block according to a comparison result;
   encoding the residual block according to the decision on whether to transform the residual block; and
   generating the second value based on the residual block,
   wherein the first value is obtained by performing a first operation on the residual block in a space domain and the second value is obtained by performing the first operation on the residual block in a transform domain.

2. The image encoding method of claim 1, wherein the transform domain is a result of transforming the space domain using one of Hadamard transform, discrete cosine transform (DCT), and discrete sine transform (DST).

3. The image encoding method of claim 1, wherein the encoding the residual block according to the decision on whether to transform comprises:
  transforming the residual block according to the decision;
  quantizing the residual block that has been transformed; and
  entropy coding the residual block that has been quantized.

4. An image encoding method based on a system on chip (SoC) which encodes a residual block of a current block, the image encoding method comprising:
  calculating a first value in a space domain for the residual block;
  comparing the first value with a predetermined threshold value and selecting one between the space domain and ache transform domain according to a comparison result; and
  encoding the residual block in the selected domain.

5. The image encoding method of claim 4, wherein the first value is a variance.

6. The image encoding method of claim 4, wherein the selecting one between the space domain and the transform domain comprises:
  selecting the space domain when the first value is greater than the threshold value; and
  selecting the transform domain when the first value is less than the threshold value.

7. The image encoding method of claim 4, wherein the selecting one between the space domain and the transform domain comprises:
  deciding to transform the residual block into the transform domain, when the first value is less than the threshold value; and
  deciding to skip the transform of the residual block, when the first value is greater than the threshold value.

8. The image encoding method of claim 4, wherein the transform domain is a result of transforming the space domain using one of Hadamard transform, discrete cosine transform (DCT), and discrete sine transform (DST).

9. The image encoding method of claim 4, wherein the encoding the residual block in the selected domain comprises:
  transforming the residual block into the selected domain;
  quantizing the residual block that has been transformed; and
  entropy coding the residual block that has been quantized.

10. An image encoding apparatus based on a system on chip (SoC) which encodes a residual block of a current block, the image encoding apparatus comprising:
  a space variance calculator configured to calculate a variance for the residual block in a space domain;
  a transform variance calculator configured to calculate a variance for the residual block in a transform domain;
  a comparator configured to compare the variance for the residual block in the space domain with the variance for the residual block in the transform domain and decide whether to transform the residual block according to a comparison result;
  a transform unit configured to transform the residual block into the transform domain according to the decision on whether to transform the residual block;
  a quantization unit configured to quantize the residual block that has been transformed; and
  an entropy coding unit configured to perform entropy coding on the residual block that has been quantized.

11. The image encoding apparatus of claim 10, wherein the transform unit skips the transform of the residual block, when the variance in the space domain is greater than the variance in the transform domain and transforms the residual block into the transform domain, when the variance in the space domain is less than the variance in the transform domain.

* * * * *